US006950088B2

(12) United States Patent
Dalal

(10) Patent No.: US 6,950,088 B2
(45) Date of Patent: Sep. 27, 2005

(54) SYNCHRONIZING OPTICAL SCAN AND ELECTRICAL ADDRESSING OF A SINGLE-PANEL, SCROLLING COLOR LCD SYSTEM

(75) Inventor: Sandeep M. Dalal, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 441 days.

(21) Appl. No.: 10/173,367

(22) Filed: Jun. 17, 2002

(65) Prior Publication Data

US 2003/0231159 A1 Dec. 18, 2003

(51) Int. Cl.[7] .................................................. G09G 3/36

(52) U.S. Cl. .......................... 345/102; 345/87; 345/88; 345/98; 345/630; 40/444; 40/448; 340/815.65; 382/149; 382/154; 382/282; 382/289

(58) Field of Search ............................. 345/87, 88, 98, 345/102, 630; 40/444, 448; 340/815.65; 382/149, 154, 282, 289

(56) References Cited

U.S. PATENT DOCUMENTS

| | | | | | |
|---|---|---|---|---|---|
| 3,995,107 | A | * | 11/1976 | Woywood | 348/316 |
| 5,300,767 | A | * | 4/1994 | Steinle et al. | 250/208.1 |
| 5,469,187 | A | * | 11/1995 | Yaniv | 345/98 |
| 5,508,738 | A | | 4/1996 | Janssen et al. | 348/196 |
| 5,774,196 | A | | 6/1998 | Marshall | 348/743 |
| 5,995,650 | A | * | 11/1999 | Migdal et al. | 382/154 |
| 6,084,235 | A | | 7/2000 | Breithaupt et al. | 250/233 |
| 6,320,568 | B1 | | 11/2001 | Zavracky | 345/101 |
| 2001/0038483 | A1 | * | 11/2001 | Lambert | 359/196 |
| 2002/0030649 | A1 | * | 3/2002 | Zavracky et al. | 345/87 |
| 2003/0231159 | A1 | * | 12/2003 | Dalal | 345/102 |

* cited by examiner

*Primary Examiner*—Bipin Shalwala
*Assistant Examiner*—Vincent E. Kovalick

(57) ABSTRACT

The electrical scan which applies data for one of the red, green and blue colors of a liquid crystal display (LCD) to the pixels of each row of the display and the optical scan of the panel with the color stripe of that color are synchronized to ensure sufficient time for the switching of the pixel from one color value to another. Synchronizing the electrical and optical scans creates a better color rendition of the displayed image without any inter-color mixing artifacts. Arrays or groups of photosensors are positioned laterally adjacent the active portion of the panel and each array is covered by a filter which passes light of only one of the three colors (red, green and blue) used in the display. The color stripes providing the optical scan are scrolled simultaneously over both the active portion of the panel and the arrays of sensors, with the electrical signals from the sensors providing an indication of the positions of the leading and trailing edges of each color stripe at each instant, and thus the instantaneous velocity of each stripe. The signals from the sensors are provided to a control circuit which determines the order in which the rows of pixels are addressed and for which of the colors to provide data in each addressed location in order to maintain the critical switching time in spite of variations in relative velocities of the three color stripes.

21 Claims, 2 Drawing Sheets

SYNCHRONIZING OPTICAL SCAN AND ELECTRICAL ADDRESSING OF A SINGLE-PANEL, SCROLLING COLOR LCD SYSTEM

TECHNICAL FIELD

The present invention relates generally to color liquid crystal displays (LCD) wherein red, green and blue color stripes are sequentially scanned over a panel made up of a multiplicity of pixels arranged in rows and, more particularly, to methods and apparatus for creating a better color rendition of the displayed image without any inter-color mixing artifacts by synchronizing the optical scan and the electrical addressing scan.

BACKGROUND AND SUMMARY OF THE INVENTION

Single-panel, color LCD systems are commonly driven by signals generated in response to an optical scan, produced by the successive scrolling of differently colored stripes, usually red, green and blue, over the pixels making up the panel, and an electrical scan, representing addresses of the rows of pixels with the signal corresponding to the color of the light impinging on the row. The optical scan is often generated by a set of three scanning prisms, although rotating color wheels and other means have also been employed. Although the prisms are intended to rotate at a constant angular velocity, the stripes produced on the surface of the panel do not necessarily move with constant linear velocity. However, the electrical address scan signal is generated, and moves through the rows of the panel in a linear manner. This means that the electrical scan and the optical scan, i.e., the leading edge of the color stripe for which data is provided by the electrical scan, may not be separated by a time interval sufficient to permit the pixels to switch in intensity, thereby producing inter-color mixing artifacts.

Typically, a given row of the panel is addressed with data corresponding to one color, followed by scanning the panel with the stripe of that color. The same row, with a first, fixed offset, is then addressed with data corresponding to the second color, followed by scanning the panel with the stripe of the second color. The same row, with a second, fixed offset, is then addressed with data corresponding to the third color, followed by scanning the panel with the stripe of the third color. The next row is then addressed with data corresponding to the first color, and so on. In order to minimize the aforementioned variations in the time period between the electrical and optical scans, thereby reducing the color errors resulting from inter-color mixing artifacts, the two fixed offsets correspond to the size of the optical stripes (in row distances) as if they were to be measured at the center of the panel. A manual adjustment of the relative rotation phases of the three prisms is then made to minimize the color errors visually with a set of red, green and blue test patterns. However, due to the potential mismatch of the electrical and optical scans, i.e., variations in the time period between the electrical address signal at a particular location on the panel and impingement of the leading edge of the color stripe at that location, the system remains susceptible to color errors.

The present invention is directed to overcoming one or more of the problems or disadvantages associated with the relevant technology.

The present invention provides a method of establishing a delay of at least a minimum duration between the electrical addressing of the panel locations with the data for the next color stripe to be scrolled across the panel and the leading edge of that color stripe impinging upon the addressed location; preferred apparatus for implementing the method is also disclosed and forms a part of the invention. The fixed delay is selected to allow sufficient time for pixel switching from one color value to another, and will vary depending upon the frame rates of the system and the liquid crystal response time. For purposes of the present discussion, the minimum duration of the delay is 2.5 ms. The fixed delay is achieved by three arrays of photosensors, each with a filter rendering it sensitive to one of the color stripes which are scrolled across the panel. The photosensor arrays are integrated on the display panel itself, e.g., in three, laterally adjacent, vertical areas along the right side of the panel.

As each horizontal color stripe is scrolled vertically down the panel surface, the-sensor array for each color will generate signals indicating the row location of the leading and/or lagging edges of the respective color stripe at any instant in time. The signals from each sensor array are fed to a control circuit which can adjust-the location of the next electrically addressed row for the respective color. The control circuit is adapted to determine the best choice of which row to address next and with which color data information based on the relative speeds of the color stripes as they are scrolled across the panel. That is, rather than following a fixed sequence of row addressing for each color (i.e., row N is addressed with red data, then green data, then blue data, row N+1 is addressed with red, then green, then blue, row N+2 is addressed with red, etc.) the control circuit may instruct the addressing in a different order, responsive to changes in the relative speeds of scanning of the color stripes, to ensure at least a minimum time delay between addressing and scanning. By "synchronizing" the addressing and scanning functions, the invention creates a better color rendition of the displayed image free of inter-color mixing artifacts.

BRIEF DESCRIPTION OF THE DRAWINGS

In the accompanying drawings, like reference numerals indicate corresponding parts throughout, wherein.

DETAILED DESCRIPTION

Optical scans of LCD panels with successive color stripes (red, green and blue) are generated by a set of three scanning prisms. Although the prisms rotate at an essentially constant angular velocity, the stripes produced on the surface of the panel do not necessarily move at a constant linear velocity. This means that the distances between stripes (from the trailing edge of one stripe to the leading edge of the next) may change as the stripes are scrolled across the surface of the panel as the relative velocity of the stripes varies. The electrical addressing of the rows of the panel with data relating to the next color to be scanned proceeds at a constant, linear velocity irrespective of the velocities of the color stripes. To effectively display an image on the panel, the electrical address must be applied to a row at least a certain minimum time prior to the color stripe impinging upon that row in order to allow sufficient time for the pixels on the panel to switch from one color value to another.

In current addressing schemes for an LCD panel, successive rows are addressed with color data in a fixed, repeated sequence with no synchronization between electrical addressing and optical scan. That is, the rows are addressed as follows:

1. Address row at location N with data corresponding to the red data for that row.

2. Address row at location N+offset $^{\Delta}1$ with data corresponding to the green data for that row.

3. Address row at location N+$^{\Delta}1$+$^{\Delta}2$ with data corresponding to the blue data for that row.

4. Address row at location N+1 with data corresponding to the red data for that row.

5. Address row at location N+1+$^{\Delta}1$ with data corresponding to the green data for that row.

6. Address row at location N+1+$^{\Delta}1$+$^{\Delta}2$ with data corresponding to the blue data for that row. And so on. The order of colors may, of course, be other than RGB.

Figure 1:
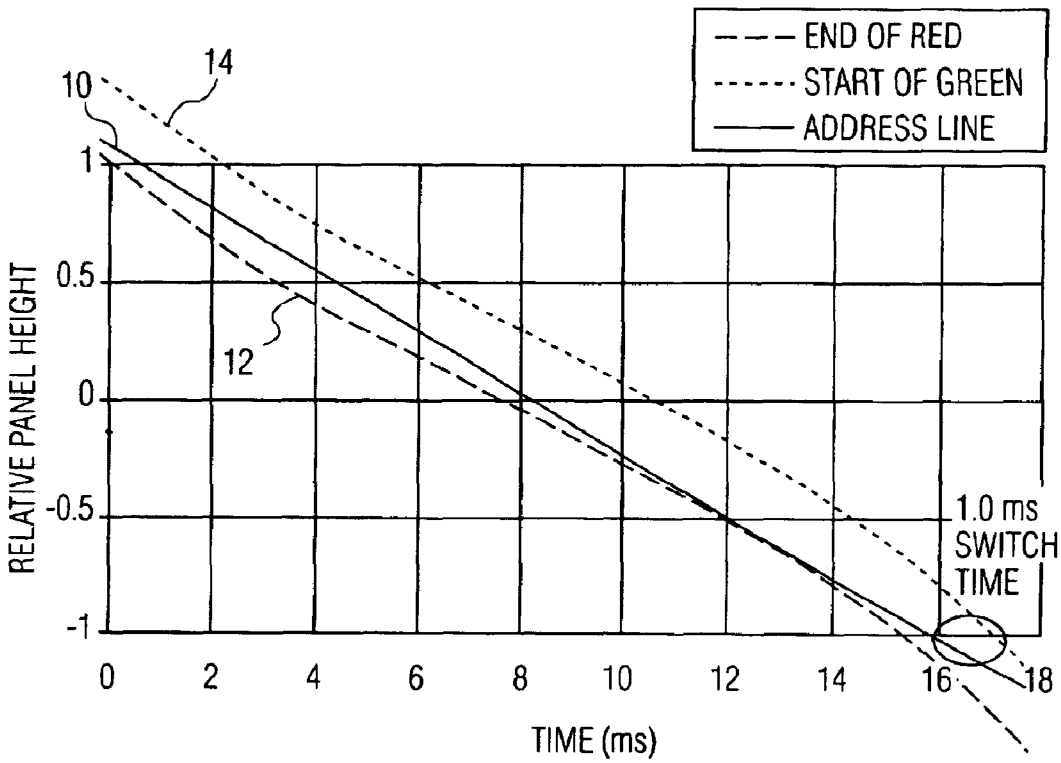
FIG. 1 is a graph illustrating a typical scan of panel location with respect to time of the trailing edge of one color (red) stripe, the electrical addressing of the panel with the data for the next color (green), and the leading edge of the green color stripe in a prior art system, i.e., a system which does not employ the present invention.

In practice, the optical scans of successive color stripes may be offset in time by different amounts as the relative speed of their scans across the surface of the panel varies. This effect is illustrated in the graph of FIG. 1. The solid line 10, representing the address signals which are generated at constant velocity, is a straight line. The dashed lines 12 and 14 indicated the trailing edge of the red color stripe (End of Red) and the leading edge of the green stripe (Start of Green), respectively, are not linear due to variations in the velocity of movement of the respective stripes. That, is, line 12 indicates where the trailing edge of the red optical stripe is located on the panel, and line 14 indicates where the leading edge of the green optical stripe is located. Because the time period between electrical addressing of a panel location and optical scanning of that location varies with variations in velocity of optical scanning, the amount of time available for the pixels on the panel to switch from one color value to another may be insufficient to avoid inter-color mixing. In the example of FIG. 1, a critical switching time of 1.0 ms is shown; i.e., the green electrical data is imposed only 1 ms prior to the leading edge of the green color stripe impinging on that particular row. At other locations on the panel this may be a much longer time, allowing the pixel to settle to the green data value well in advance of the green optical stripe arriving at that location.

In order to minimize any inter-color mixing artifacts, it is necessary to wait until the red optical stripe has passed over a particular row before electrically addressing that row with the green data. If it is determined that a minimum delay of 2.5 ms between the electrical addressing and the optical scan is required to allow for a full pixel switching time, it is apparent that the trailing edge of the red color stripe and the imposition of the electrical address at a particular location on the panel must precede the leading edge of the green stripe at that location by at least 2.5 ms. While this might be accomplished by providing much longer delays between trailing and leading edges of successive stripes, ensuring that the electrical address would be imposed at least 2.5 ms before the leading edge of the next color stripe in spite of variations in velocity of the stripes with addressing at a linear velocity, the delays involved would be unacceptable in a color LCD system. An attempt is typically made to minimize such errors by adjusting the two fixed offsets ($^{\Delta}1$ and $^{\Delta}2$ above) to correspond to the size of the optical stripes (in row distances) as if they were measured at the center of the panel. A manual adjustment of the relative rotation phases of the three prisms is then made to minimize the color errors visually with a set of red, green and blue test patterns.

Figure 2:
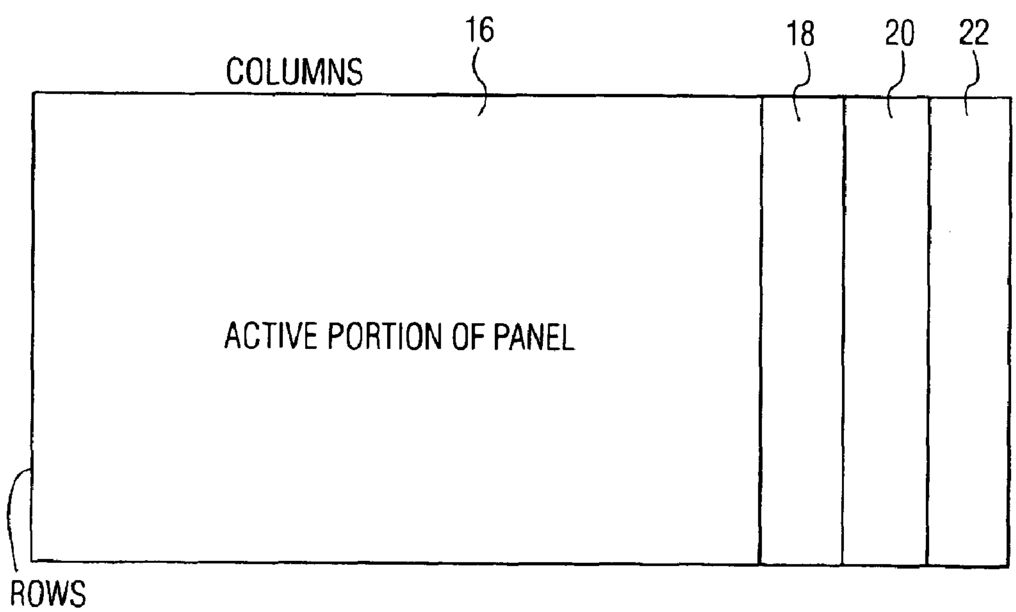
FIG. 2 is a diagrammatic representation of a LCD panel equipped with a preferred form of apparatus of the invention.
Figure 3:
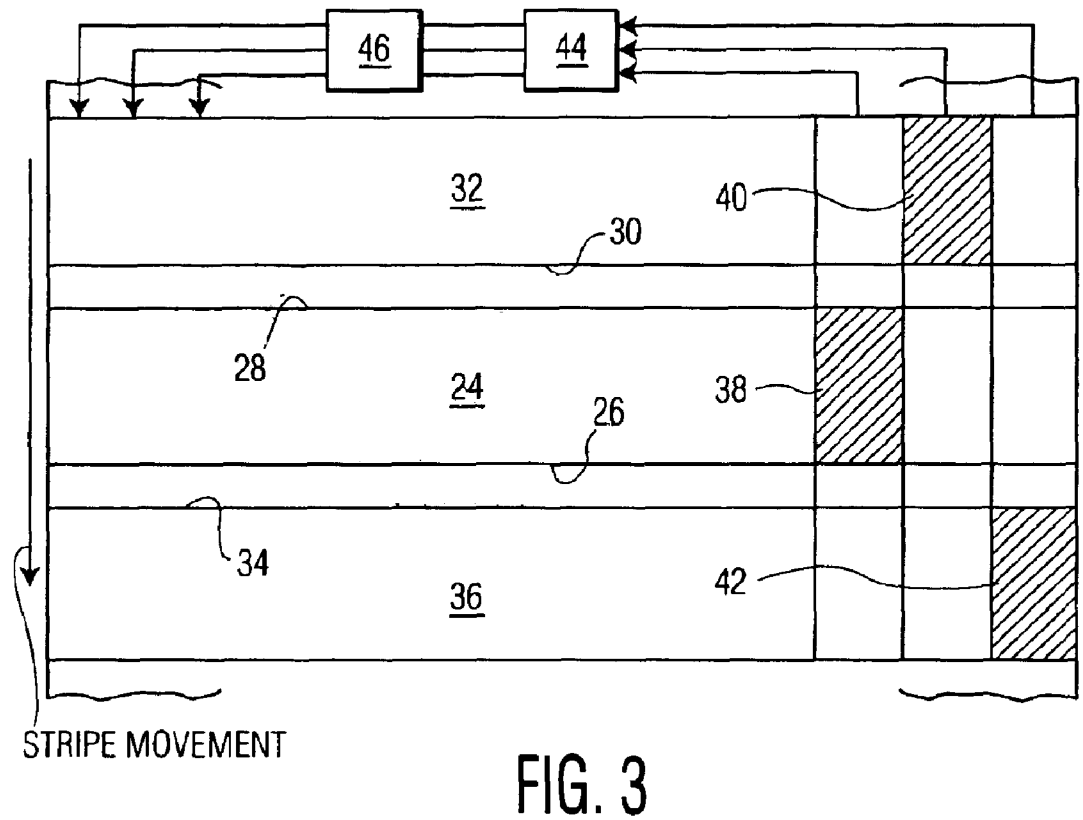
FIG. 3 is another view of the panel of FIG. 2 showing color stripes being scrolled from top to bottom, and also includes a block diagram portion illustrating implementation of the invention.

The approach of the present invention to this problem is illustrated in FIGS. 2 and 3. Active portion 16 comprises the rows and columns of pixels of a conventional color LCD panel by which the visual display is generated. Vertical strips 18, 20 and 22 at the right side of the active portion 16 represent a sensing portion of the panel comprised of three groups or arrays of photosensors each covered by a color filter. The filters are such that the filter in strip 18 passes only red light, the filter in strip 20 only green light and the filter in strip 22 only blue light. Thus, the photosensors in strips 18, 20 and 22 receive, and generate signal only in response to, red, green and blue light, respectively, as the color stripes are scrolled across the surface of the panel, including both active portion 16 and, the sensing portion, i.e., strips 18, 20 and 22. In the case of LCOS (Liquid Crystal on Silicon) technology, where the display panel is made in a standard silicon CMOS process, it is quite feasible to integrate such photosensors on the display panel itself. Strips 18, 20 and 22 are positioned in side-by-side relation along the right side of active portion 16 and have a combined width which is preferably less than half the width of active portion 16. It should be noted that it is not the width per se which is important, but rather the sensor's sensitivity to the amount of light that it can capture.

FIG. 3 illustrates the color stripes being scrolled downwardly over the panel surface. The complete red stripe 24 is visible in the Figure from leading edge 26 to trailing edge 28. Leading edge 30 of green stripe 32 is visible, but the trailing edge of this stripe has not yet reached the panel in the position shown. Likewise, trailing edge 34 of blue stripe 36 is shown, but the leading edge has already passed the bottom of the panel. Shaded area 38 indicates the portion of strip 18 which is covered by red stripe 24 and thus the photosensors in strip 18 which are generating signals in response to the optical scan at the illustrated position of the stripes. Shaded areas 40 and 42 indicate the portions of strips 20 and 22, respectively, which are covered by green and blue stripes 32 and 36, respectively. Thus, each group of sensors will output signals corresponding to row locations where the leading and trailing edges of each of the three color stripes are positioned at each instant. The output signals from the photosensors in each vertical strip are connected to a control circuit represented by block 44. This circuit generates output signals commensurate with the velocities of movement of the color stripes across the surface of the display panel. These signals are provided to electrical addressing block 46.

FUNCTIONAL DESCRIPTION

The signals from the photosensors in strips 18, 20 and 22 indicate to control circuit 44 the instantaneous position and velocity of the color stripes. The function of control circuit 44 is to process these signals to determine the best choice of which row should be addressed next and with which color data information in order to keep the addressing at least the predetermined time interval (2.5 ms) ahead of the color stripe. That is, if the input signals to control circuit 44 indicate that the red color stripe is moving faster that the green and blue stripes then it must instruct addressing block

46 to address the corresponding rows with the red color data on a more immediate basis. In effect, the electrical addressing is responsive in time to the optical scan since the control circuit functions to synchronize the two scans.

In the example of the red stripe advancing faster at a particular location on the panel than the green and blue stripes, the electrical addressing will be guided by control circuit 44 to address more than one consecutive row of data for the red color before addressing the rows located for impingement of the green and blue stripes. In this case, the sequence of row addressing may be:

1. Address row at location N with data corresponding to the red data for that row.

2. Address row at location N+1 with data corresponding to the red data for that row.

3. Address row at location $N+^{\Delta}1$ with data corresponding to the green data for that row.

4. Address row at location $N+^{\Delta}1+^{\Delta}2$ with data corresponding to the blue data for that row.

5. Address row at location N+2 with data corresponding to the red data for that row.

6. Address row at location N+3 with data corresponding to the red data for that row.

7. Address row at location $N+1+^{\Delta}1$ with data corresponding to the green data for that row.

8. Address row at location $N+1+^{\Delta}1+^{\Delta}2$ with data corresponding to the blue data for that row and so on.

Figure 4:
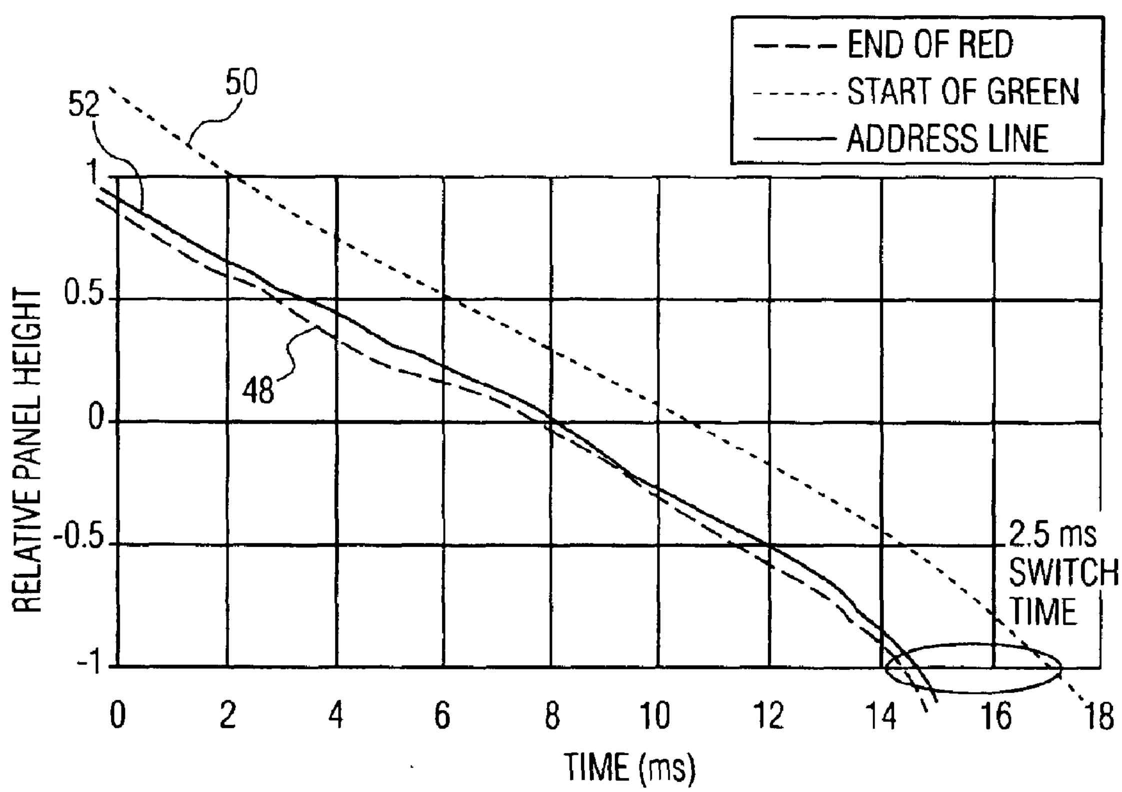
FIG. 4 is a graph of the same parameters as that of FIG. 1 when implementing the invention.

FIG. 4 provides a graphical illustration of the scans of the trailing (48) and leading (50) edges of the red and green stripes, respectively, and the electrical addressing of the rows with the green color data with implementation of the present invention. The graph corresponds to the plot of the same parameters in FIG. 1. However, instead of the addressing (solid) line 52 being straight, indicating a constant velocity, as in FIG. 1, it is essentially parallel with dashed line 50, representing the leading edge of the green color stripe. This means that the addressing of the rows with the green color data remains in preceding relation to impingement of the green stripe by at least the critical switching time, in this example, 2.5 ms.

The addressing order will change in response to changes in the position, color and velocity of the stripe on the panel. The invention ensures that the data for a row gets addressed in a synchronized fashion with the optical scan on the panel, providing the required critical switching time for the pixels to change from one color value to another. This allows a more uniform pixel switching time at all location on the panel. In addition, the use of photosensors to determine the location of the stripes at all times eliminates the need to manually adjust the prisms. This is beneficial since any changes in the system due to movement in the optics or mechanical wear or slip in the prism motors will be compensated for by the synchronized electrical addressing, thus avoiding any color errors in the displayed image.

Other aspects and features of the present invention can be obtained from a study of the drawings, the disclosure, and the appended claims.

What is claimed is:

1. The method of driving single-panel, scrolling, color liquid crystal displays comprising an array of pixels arranged in a plurality of rows, wherein stripes of a plurality of different colors are consecutively scrolled in a predetermined direction across the surface of said panel with the trailing and leading edges of successive stripes in spaced relation to provide an optical scan, the leading edge of each of said stripes being preceded by an electrical addressing scan representing an addressing of discrete locations on said panel with the data for the following one of said colors, said method comprising:

a) providing electrical signals commensurate with a continuous indication of the location on said panel of the leading and trailing edges of each of said stripes which are present on said panel; and b) generating said electrical addressing scan at a time preceding by a predetermined interval said leading edge of said following color stripe, said predetermined interval being sufficient to allow full switching time of the individual pixels of said display from one color value to another.

2. The method of claim 1 wherein said electrical signals are generated by photosensors.

3. The method of claim 2 wherein said photosensors are arranged in a number of groups corresponding to the number of said plurality of different colors, each of said groups being responsive to a respective one of said colors.

4. The method of claim 3 wherein said panel is divided into a first portion comprising said pixels and forming an active display, and a second portion comprising said groups of photosensors.

5. The method of claim 4 wherein said panel is made in a standard silicon CMOS process with both said pixels and said photosensors integrated on said panel.

6. The method of driving an LCD panel to improve color rendition of the displayed image without inter-color mixing artifacts comprising:

sensing an optical scan of the panel with a light stripe of a color to provide a timing signal corresponding to the optical scan of the color, and synchronizing electrical addressing lines of pixels making up said panel with data for the color with the timing signal.

7. The method of claim 6 wherein said synchronizing includes continuous monitoring of at least one of the velocity and position of said light stripe for each of said colors.

8. The method of claim 7 wherein said velocity and/or position monitoring is implemented by photosensors which are traversed by said optical scan with said light stripes.

9. The method of claim 7 wherein said synchronizing further includes controlling the sequence of location and color data of said electrical addressing in response to said light stripe velocity.

10. The method of claim 7 wherein said predetermined time delay is established at no less than the minimum critical switching time of said pixels from one color value to another.

11. Apparatus for controlling the timing of electrical addressing signals provided to the rows of pixels in a LCD panel relative to successive optical scans by light stripes of a plurality of different colors which are scrolled across the surface of said panel, said apparatus comprising:

a) a plurality of groups of photosensors corresponding in number to said plurality of different colors, each of said groups generating electrical signals in response to impingement thereon of a corresponding one of said colors, said groups being positioned to receive said optical scans as the latter are scrolled across said panel, whereby said electrical signals are indicative of at least one of the velocity and position of said optical scans;

b) a control circuit to which said electrical signals are provided as input signals, said control circuit generating control signals commensurate with the velocities and/or positions of each of said optical scans as indicated by said input signals;

c) an addressing circuit adapted to generate electrical scans each directed to a particular one of said rows with color data for one of said colors in response to said control signals, the order of addressing said rows and the selection of the color for which data is provided being selected by said control circuit to maintain a critical switching time between said electrical scan providing color data for one of said colors and the optical scan for that color, said switching time being sufficient for said pixels to change from one color value to another.

12. The apparatus of claim 11 wherein each of said groups of photosensors is covered by a filter which passes only light of one of said plurality of colors.

13. The apparatus of claim 12 wherein said photosensors are integrated on the surface of said LCD panel.

14. The apparatus of claim 13 wherein the number of said plurality of colors is three, namely, red, green and blue.

15. The apparatus of claim 14 wherein said groups of photosensors are arranged in side-by-side relation in strips extending along one or both side edges of said panel.

16. A color LCD panel comprising:

a) an active portion comprising a plurality of horizontal rows of individual pixels, each responsive to an electrical scan carrying data for one of a plurality of colors and an optical scan which is scrolled in a vertical direction over said rows of pixels; and b) a sensing portion comprising a plurality of arrays of photosensors, corresponding in number to said plurality of colors, positioned laterally adjacent one side of said active portion to receive said optical scan simultaneously with said active portion, and to produce an electrical signal in response to impingement thereon of said optical scan.

17. The LCD panel of claim 16 wherein the number of said plurality of colors and of arrays is three.

18. The LCD panel of claim 17 and further including three color filters, one positioned in covering relation to each of said arrays, each of said filters passing light of a respective one of said colors.

19. The LCD panel of claim 18 wherein said pixels and photosensors are integrated on said panel, the latter being made in a standard CMOS process technology.

20. A display device comprising:

a screen that is configured to display an image based on an optical scan of stripes of color, and a controller that is configured to enable select linearly arranged pixels corresponding to the stripes of color, wherein the screen includes one or more sensors that are arranged to detect the optical scan of one or more of the stripes of color, and to provide therefrom one or more signals corresponding to the optical scan, and the controller is configured to enable the select pixels based on the one or more signals corresponding to the optical scan.

21. The display device of claim 20, wherein the screen includes three sets of sensors, each set being responsive to a predetermined color corresponding to each color of the stripes of color, and the controller is configured to enable the select pixels corresponding to each color of the stripes of color based on the one or more signals corresponding to the optical scan.

* * * * *